United States Patent
Waldmann

[19]

[11] Patent Number: 6,139,171
[45] Date of Patent: Oct. 31, 2000

[54] EXTERIOR REARVIEW MIRROR FOR VEHICLES, PREFERABLY MOTOR VEHICLES

[75] Inventor: Bernd Waldmann, Nürtingen, Germany

[73] Assignee: Reitter & Schefenacker GmbH & Co. KG, Germany

[21] Appl. No.: 09/267,146

[22] Filed: Mar. 11, 1999

[30] Foreign Application Priority Data

Mar. 13, 1998 [DE] Germany ........................ 298 04 489 U

[51] Int. Cl.⁷ ............................................. B60Q 1/26
[52] U.S. Cl. .............................................. 362/494; 362/511
[58] Field of Search ................................. 362/494, 511, 362/540, 545

[56] References Cited

U.S. PATENT DOCUMENTS

| 5,303,130 | 4/1994 | Wei et al. | 362/83.1 |
| 5,313,335 | 5/1994 | Gray et al. | 362/135 X |
| 6,045,243 | 4/2000 | Muth et al. | 362/494 |

*Primary Examiner*—Stephen Husar
*Attorney, Agent, or Firm*—Robert W. Becker & Associates

[57] ABSTRACT

An exterior rearview mirror for a motor vehicle has a mirror head having a housing and a mirror pane mounted in the housing. The housing has a light window. At least one light source is mounted in the housing and positioned behind the light window. The light window consists at least partially of a light guide material in order to ensure complete and uniform illumination.

35 Claims, 8 Drawing Sheets

EXTERIOR REARVIEW MIRROR FOR VEHICLES, PREFERABLY MOTOR VEHICLES

BACKGROUND OF THE INVENTION

The present invention relates to an exterior rearview mirror for vehicles, especially motor vehicles, having a mirror head with a housing in which an adjustable mirror pane is positioned and in which at least one light source is arranged which is located in an area behind a light window of the housing.

Exterior rearview mirrors are known which have a housing having at the back side a light window. In the housing of the mirror head a light bulb is provided which, for example, serves as a turn signal. The light emitted by the incandescent light bulb penetrates through the light window to the exterior and is visible to oncoming traffic.

It is an object of the present invention to embody the aforementioned exterior mirror such that the light window, while being manufactured in a simple and inexpensive manner, can be reliably detected from the exterior when illuminated.

SUMMARY OF THE INVENTION

This object is inventively solved in that the light window is at least partially comprised of light guide material.

Accordingly, in the inventive exterior rearview mirror at least a portion of the light window consists of a light guide material. The light emitted by the light source is distributed by the light guide material. Accordingly, in principle a single light source is sufficient in order to completely illuminate the area of the light guide material. Thus, the light window can be easily detected, even during the day when the light source is turned on. Preferably, the entire light window is comprised of the light guide material.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiment utilizing FIGS. 1 through 8.

Figure 1:
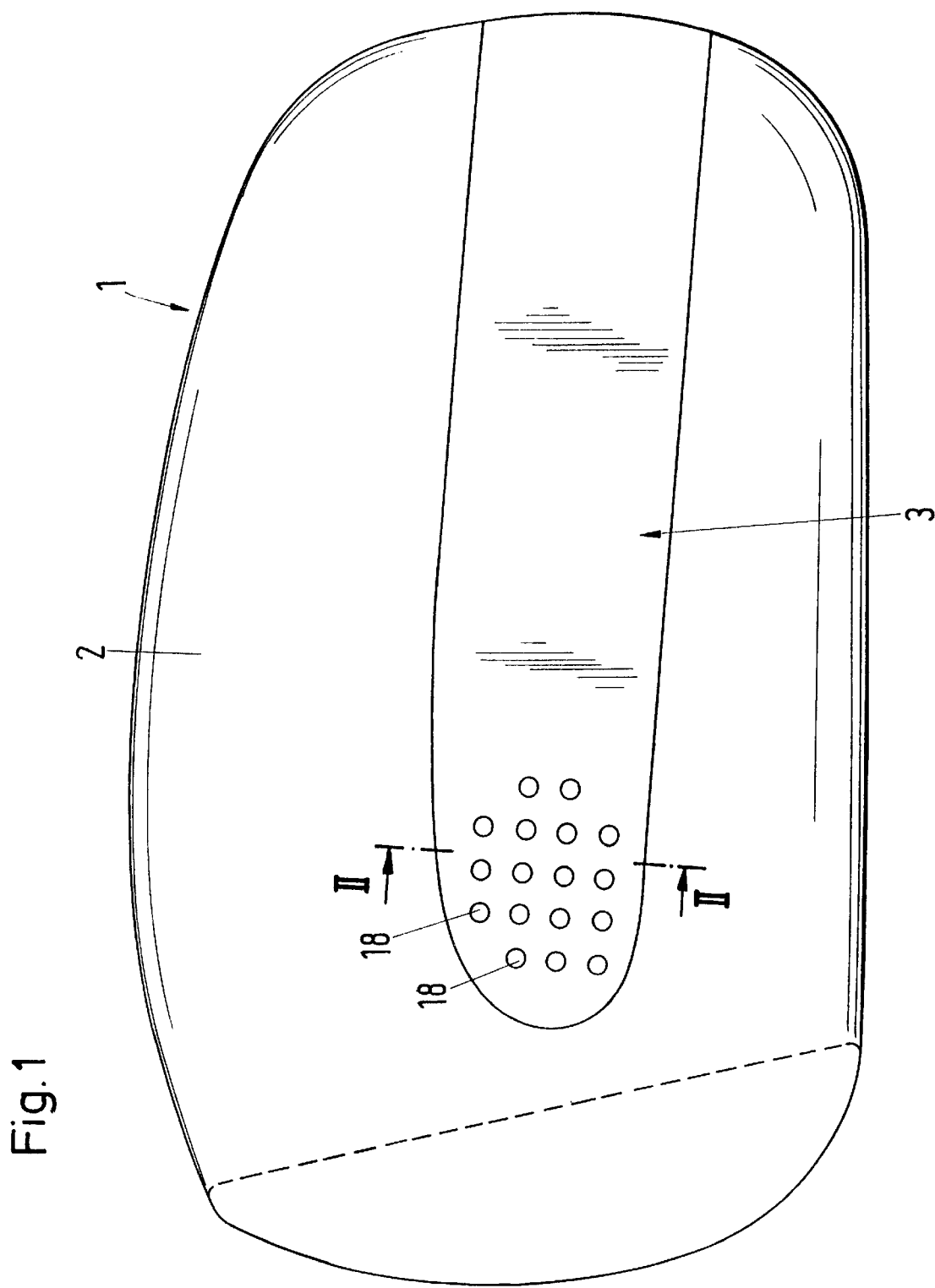
FIG. 1 is a view of the back side of the inventive exterior rearview mirror.

The exterior rearview mirror is provided for motor vehicles and has a mirror head 1 connected by a mirror support to the motor vehicle. The mirror head 1 is preferably foldable relative to the mirror support so that it can be moved from a position of use into a parking position. The mirror head 1 has a mirror housing 2 whose back side is shown in FIG. 1. The mirror housing 2 has at its front side, in a manner known to a person skilled in the art, a mirror pane which is fastened to an adjustable (movable) support plate.

The back side of the housing 2 is provided with a light window 3 which is positioned at half the height of the housing 2 and extends from the mirror support into the vicinity of the end of the mirror housing farthest removed from the support.

Figure 2:
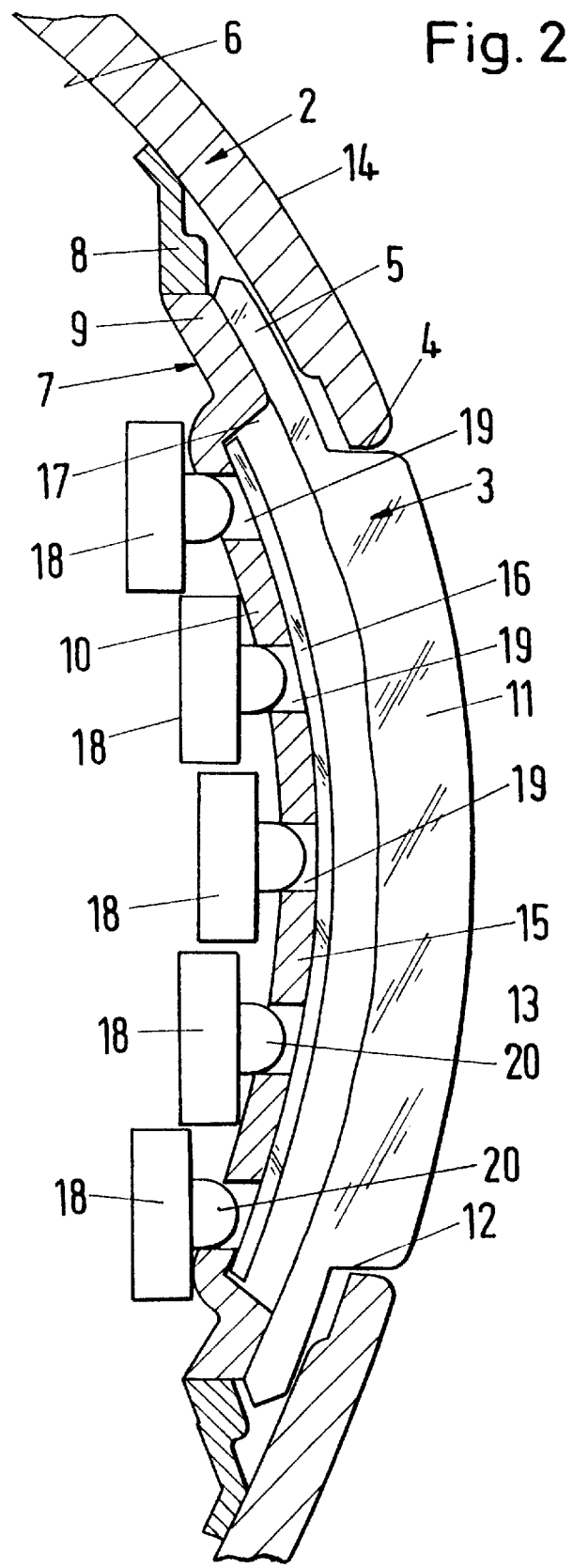
FIG. 2 shows at an enlarged scale a section along the line II—II of FIG. 1.

The light window 3 is embodied as a light guide with which an optimal illumination of the light window is ensured. As can be seen in FIG. 2, the light window 3 is inserted into a mounting opening 4 of the mirror housing 2. The light window 3 has a circumferential rim 5 which is thinner than the portion of the light window 3 mounted in the mounting opening 4 (see FIG. 2). The circumferential rim 5 rests at the inner side 6 of the mirror housing 2 along the edge of the mounting opening 4. The light window 3 is pressed by a cover 7, mounted in the interior of the housing 2, against the inner side 6 of the housing 2. The cover 7 is provided along its edge with a circumferential seal 8 which is preferably comprised of rubber and rests sealingly at the inner side 6 of the housing 2. The circumferential seal 8 is advantageously injection-molded to the edge of the cover 7.

The cover 7 has a circumferential edge 9 which rests with its surface at the rim 5 of the light window 3. The remaining portion 10 of the cover 7 is recessed relative to the edge 9 and has a spacing to the light window 3. The portion 10 of the cover 7 is adapted in its contour to the portion 11 of the light window 3 positioned in the mounting opening 4. The cover 7 is fastened, preferably detachable in a suitable manner to the housing 2, for example, with screws etc. The cover 7 forces the rim 5 of the light window 3 securely against the inner side 6 of the housing 2. The circumferential seal 8 is thus elastically deformed so that a reliable sealing action is ensured. The rim 5 of the light window 3 matches the inner side 6 of the housing 2 so that the rim 5 rests with its surface at the inner side 6 of the housing. The light window 3 is thus reliably positioned in the mounting opening 4. The portion 11 of the light window 3 positioned in the mounting opening 4 is designed such that it rests snuggly with its edge 12 at the edge of the mounting opening 4 or so as to have only a minimal spacing therefrom. The outer side 13 of the light window 3 is designed such that it forms a continuous contour of the outer side 14 of the housing 2 in the area of the mounting opening 4.

The outer side 15 of the central portion 10 of the cover 7 facing the light window 3 has a transparent covering that is a foil 16 or any other relatively thin plastic sheet applied thereto. The foil/plastic sheet 16 can be uncolored or can be colored. Advantageously, the foil or plastic sheet 16 rests with its edge at the transitional portion 17 between the central portion 10 and the edge 9 of the cover 7. This transitional portion 17 projects passed the foil/plastic disc 16 so that no additional components are required for a safe positioning thereof.

Behind the cover 7 the LEDs 18 are arranged which, as can be seen in FIG. 1, are positioned above and adjacent to one another within the end portion of the light widow 3 facing away from the motor vehicle. The LEDs 18 have a long service life and short response times. The LEDs 18 are connected in a suitable manner to the mirror head 1 and connected to the electrical system of the motor vehicle. In order for the light emitted by the LEDs 18 to penetrate through the light window 3, the cover 7 is provided with penetration openings 19 for the LEDs 18. In the cylindrically embodied openings 19 the illumination bodies 20 (FIG. 2) of the LEDs 18 are positioned. The openings 19 serve as an antiglare protection for sunlight impinging at a slant. Since the illumination bodies 20 of the LEDs 18 project only partially into the openings 9, it is thus ensured that the illuminated light window 3 can be reliably seen even when sunlight impinges at an angle. The LEDs 18 can be colored so that in this case the foil/plastic sheet 16 is uncolored. However, it is also possible to use white LEDs 18 and, if a certain color is desired, a respectively color foil/plastic sheet 16 is provided.

The light emitted by the LEDs 18 can reach through the openings 19 and the foil/plastic sheet 16 the light window 3. Since the light window 3 is embodied as a light guide, the impinging light is distributed over the entire surface of the light window 3. The illuminated light window 3 is easily visible, even when the sunlight is very bright. Since the light window 3 extends substantially from the mirror support to the end of the mirror housing 2 facing away from the motor vehicle, the illuminated light window 3 can be easily and reliably detected in traffic. The light window 3 can also have other contours as the one indicated in FIG. 1. It is also possible to employ a plurality of light windows 3. The LEDs 18 within the light window 3 could be used as a turn signal light.

Figure 3:
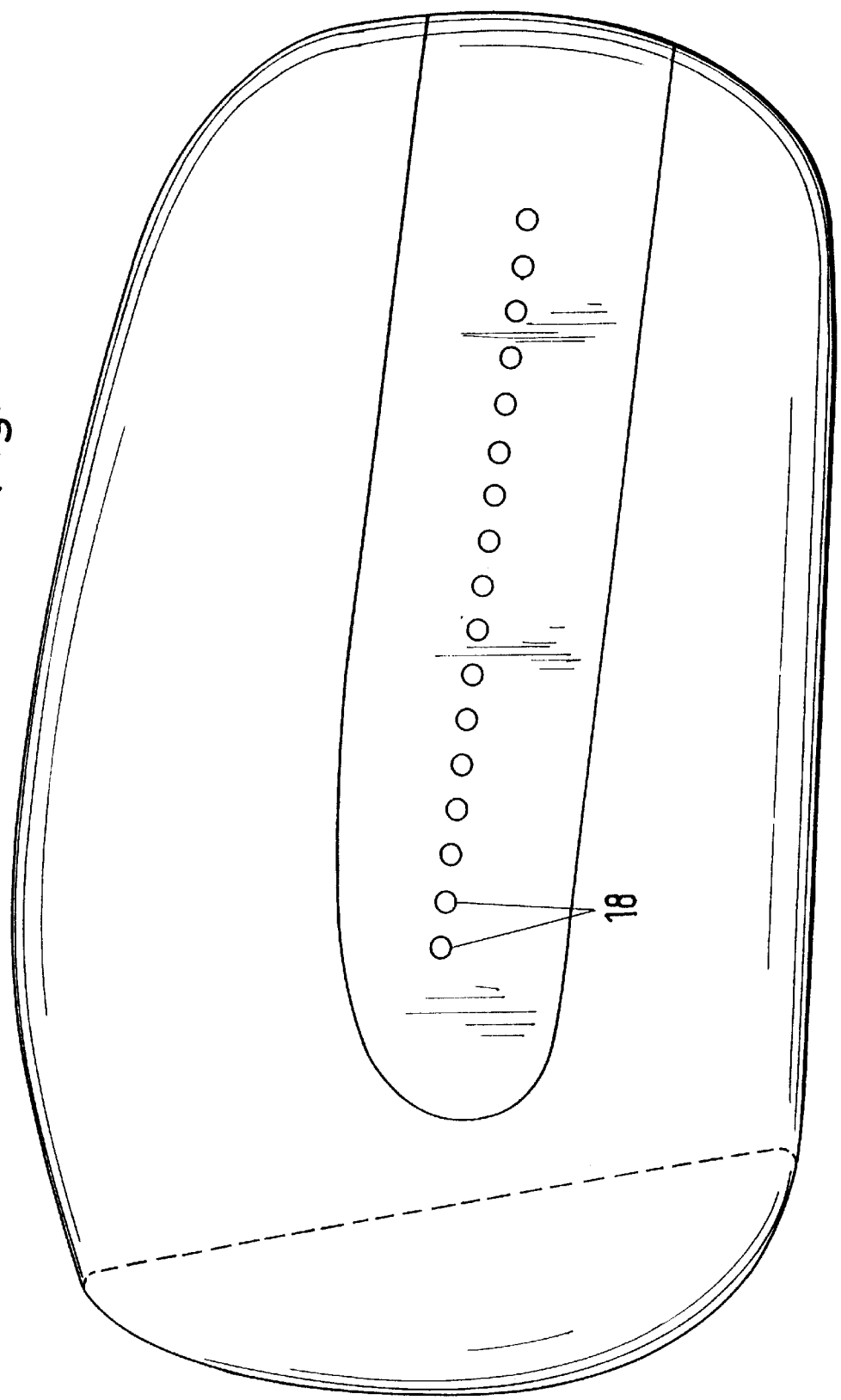
FIG. 3 shows in a representation corresponding to FIG. 1 second embodiment of the inventive exterior rearview mirror.

FIG. 3 shows the possibility to arrange the LEDs 18 in a row along the length of the light window 3. This also ensures an optimal illumination of the light window 3. The arrangement of the LEDs 18, depending on the desired use of the light window 3, can be selected differently from the represented embodiment.

Figure 4:
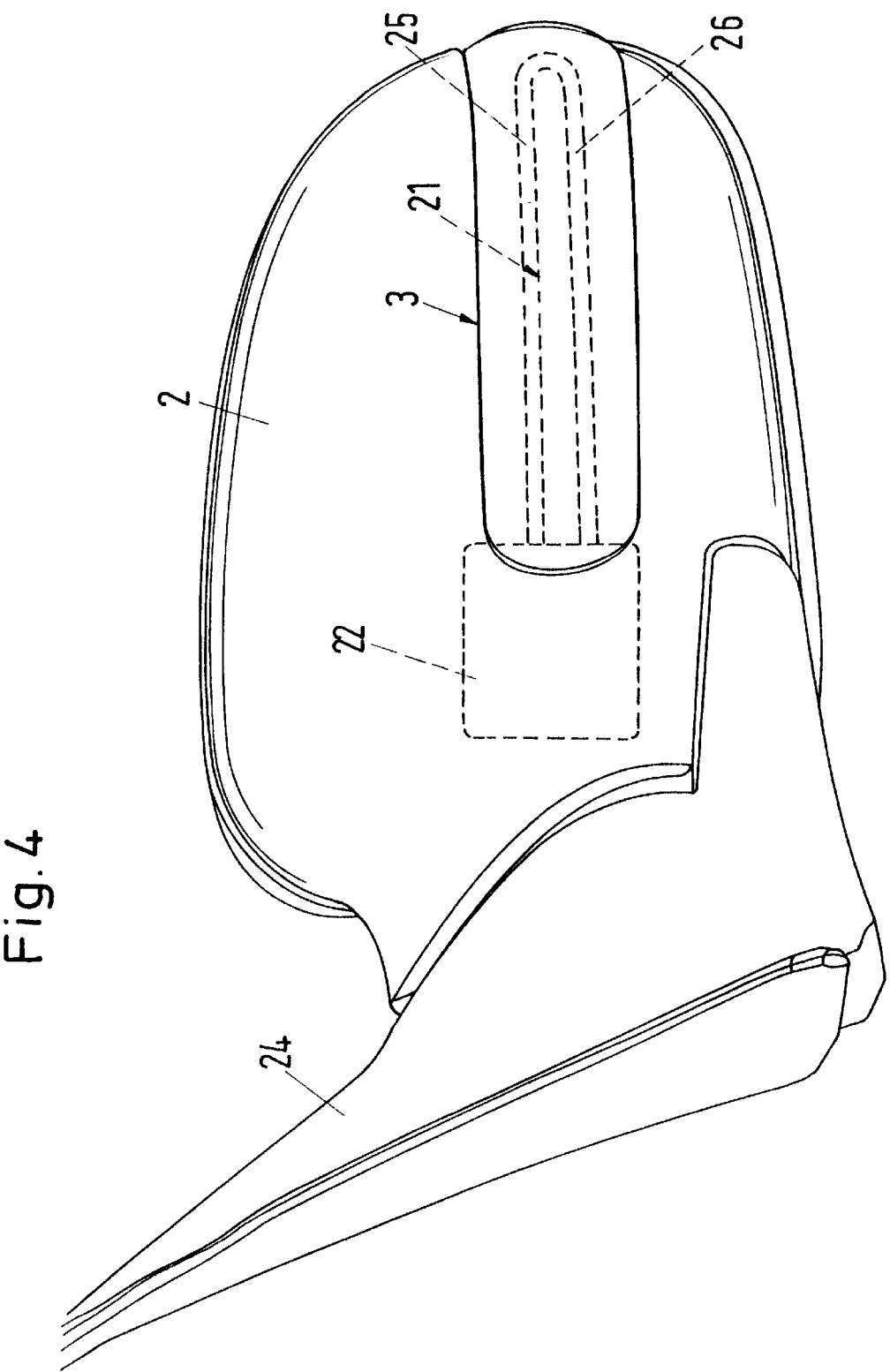
FIG. 4 is a view of the back side of a third embodiment of the inventive rearview mirror.
Figure 5:
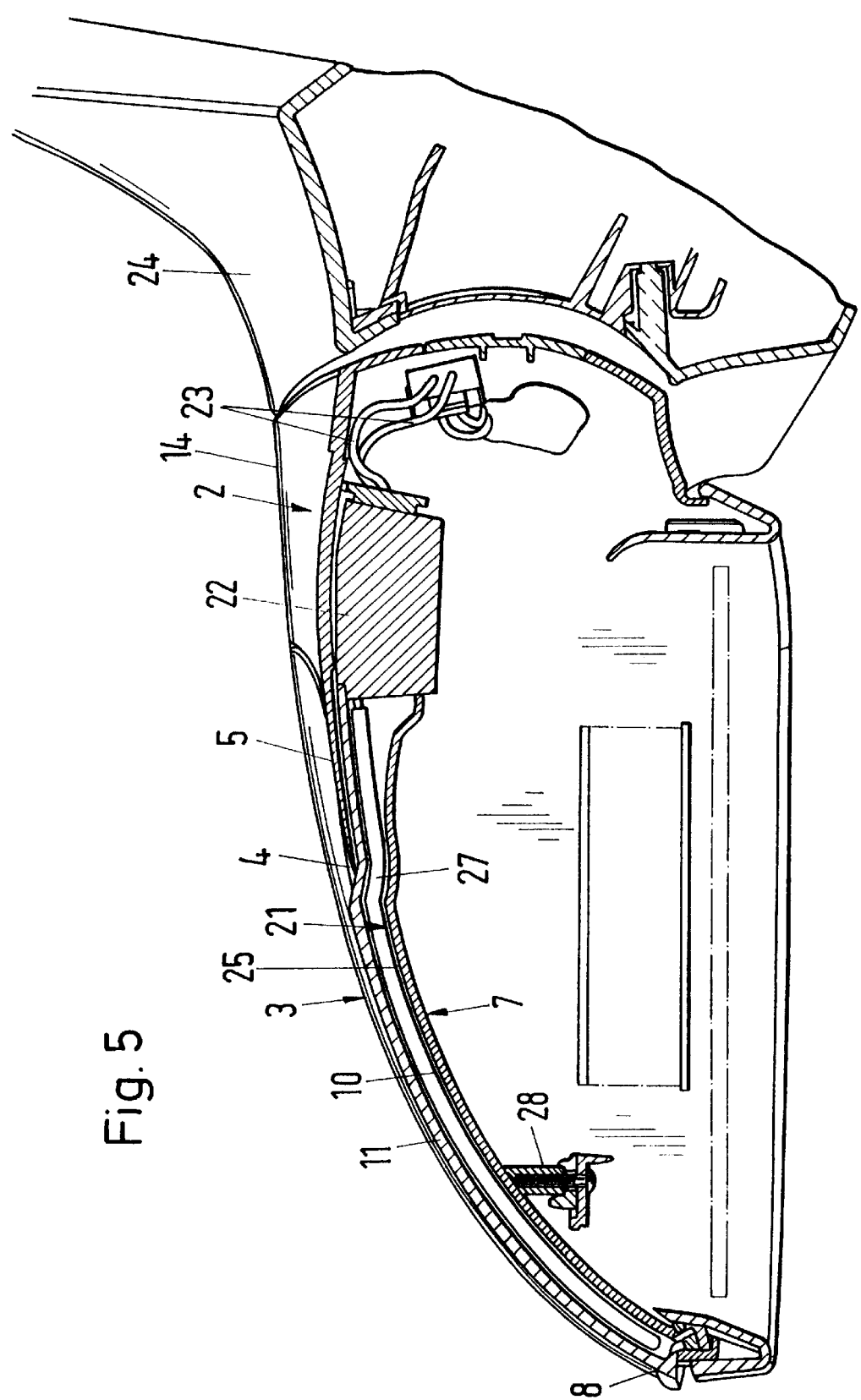
FIG. 5 is a cross-section of the exterior rearview mirror according to FIG. 4.
Figure 6:
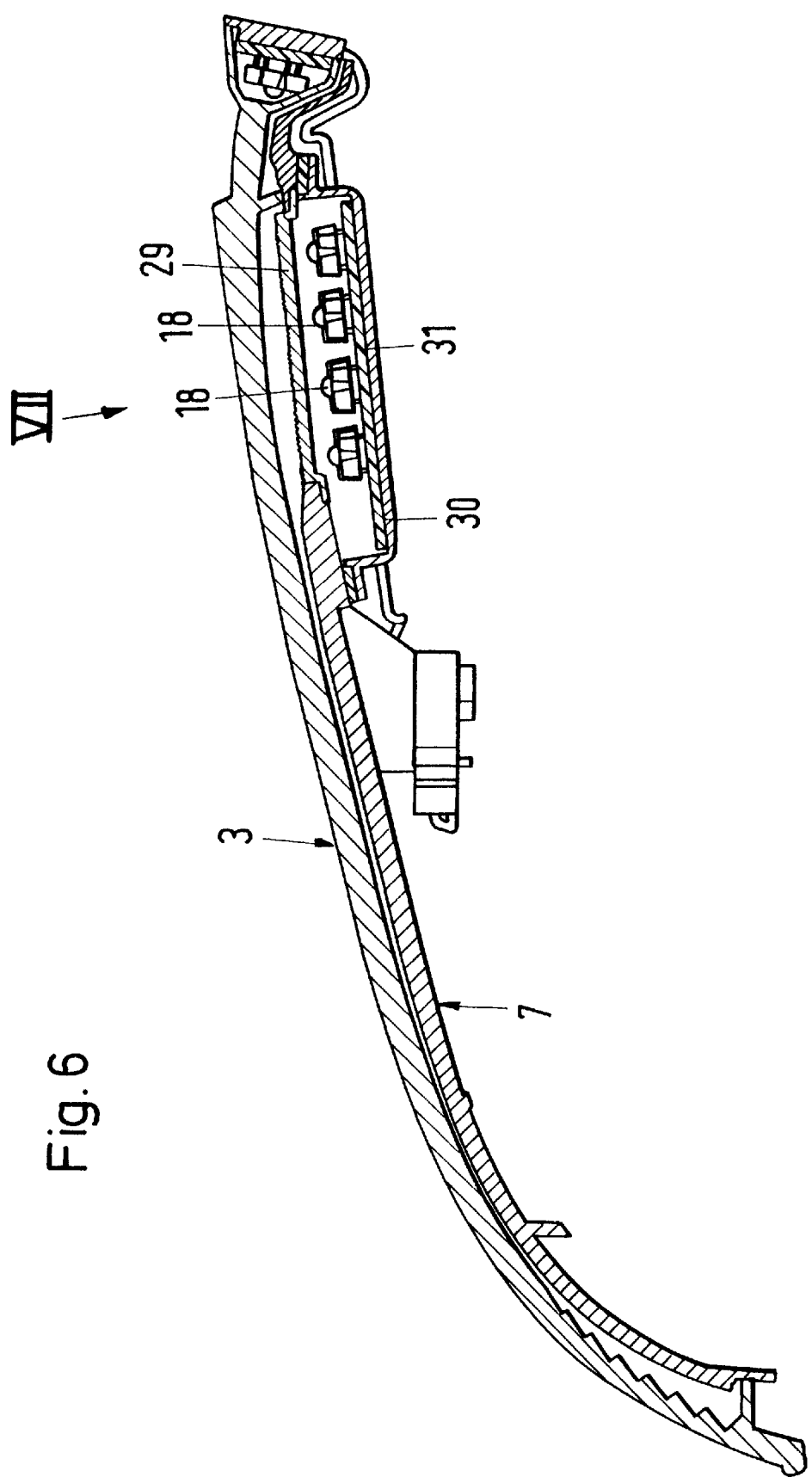
FIG. 6 is a section of the mirror head housing of a fourth embodiment of the inventive exterior rearview mirror.
Figure 7:
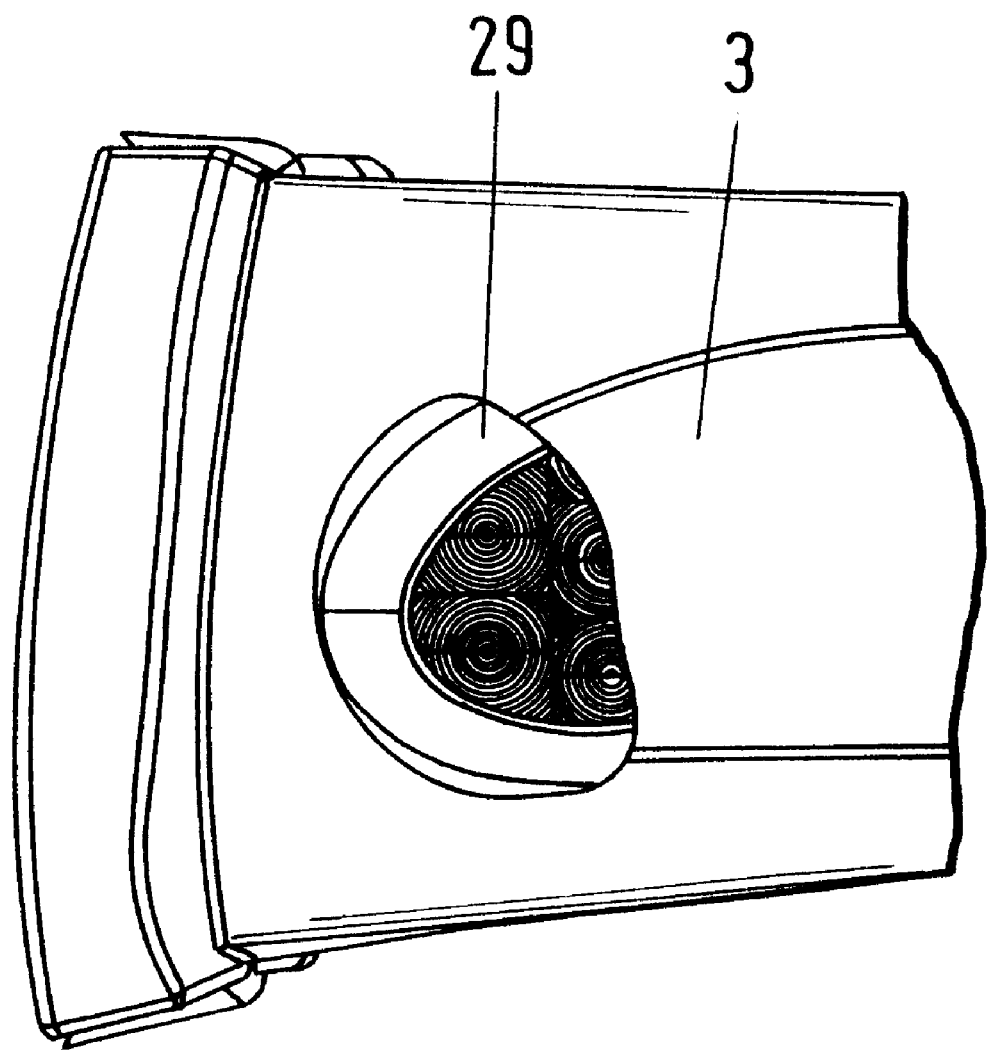
FIG. 7 is a view in the direction of arrow VII of FIG. 6.

In the embodiment according to FIGS. 4 and 5, the light window 3 extends from the end of the mirror housing 2 farthest away from the mirror support 1 approximately over half of the mirror housing 2. It is arranged substantially at half the height of the mirror housing 2. The light window 3 is again embodied as a light guide with which an optimal illumination of the light window 3 is ensured. Directly behind the light window 3 the light source is shown which is in FIG. 4 a U-shaped fluorescent tube 21 which is connected to a control device 22 arranged in the mirror housing 2. It is advantageously positioned directly adjacent to the light window 3 at the inner side of the mirror housing 2 (FIG. 5) and is connected by electrical lines 23, which are guided through the mirror support 24, to the electrical system of the motor vehicle.

The light window 3 has a portion 11 positioned in the mounting opening 4 which is embodied advantageously such that in the area of the mounting opening 4 it forms a continuous contour together with the outer side 14 of the housing 2. The rim 5 of the light window 3 engages the circumferential edge of the mounting opening 4. As in the previous embodiments, the light window 3 is provided with a seal 8 which sealingly rests at the inner side 6 of the housing 2.

The fluorescent tube 21 is positioned between the light window 3 and the cover 7 that completely covers the backside of the light window 3.

The two legs 25, 26 (FIG. 4) of the fluorescent tube 21 extend from the end of the light window 3 facing the mirror support toward the end of the light window 3 opposite the mirror support and have a curved transition. The two legs 25, 26 are positioned at a spacing above one another, and are located, when viewed in a rearview according to FIG. 4, substantially at half the height of the light window 3. As can be seen in FIG. 5, the legs 25, 26 are adapted to the cross sectional shape of the light window 3 so that they have a recessed portion 27 matching the shape of the light window 3. The cover 7 is connected with screws 28 to the mirror housing 2.

Due to the U-shaped embodiment of the fluorescent tube 21 an optimal illumination of the light window 3 is achieved. As shown in FIG. 4, the two legs 25, 26 of the fluorescent tube 21 extend into the vicinity of the end of the light window 3 facing away from the mirror support 24. The fluorescent tube 21 may also have any other suitable shape which must be provided such that the light window 3 is illuminated in an optimal fashion. The fluorescent tube 21 can emit white or colored light. The light window 3, as in the previous embodiments, can be uncolored or colored. It is also possible that the central portion 10 of the cover 7 facing the light window 3 has a foil or a respectively embodied thin plastic sheet which is transparent. The foil/plastic sheet can be colored or uncolored.

The light window 3 in the embodiment according to FIGS. 6 and 7 is again embodied as a light guide with which an optimal illumination of the light window is ensured. This light window 3, according to the previous embodiments, is inserted into the mounting opening of the mirror housing 2. Behind the light window 3, at a small spacing thereto, the cover 7 is positioned having a shape which substantially matches the shape of the light window 3. Close to the end of the light window 3 at the mirror support side the cover 7 is provided with a Fresnel lense 29. It can be embodied as a unitary part of the cover 7, but can also be provided as separate part. At the side of the Fresnel lense 29 facing away from the light window 3 a printed circuit board 30 is provided which has light sources in form of LEDs 18. The printed circuit board 30 is positioned in the housing 31 which is fastened at the side of the cover 7 facing away from the light window 3.

The light window 3, the cover 7 as well the housing 31 with the LEDs 18 arranged therein and the printed circuit board 30 provide a pre-assembled unit which can be inserted into the interior of mirror housing 2 and attached thereto in a suitable manner. The Fresnel lense 29 ensures that the light emitted by the LEDs 18 is transmitted optimally onto the light window 3. Since the light window 3 is comprised of a light guide material, the light window is optimally illuminated over its entire surface area. The housing 31 is sealed so that dirt and/or moisture cannot reach the printed circuit board 30 and/or the LEDs 18.

Figure 8:
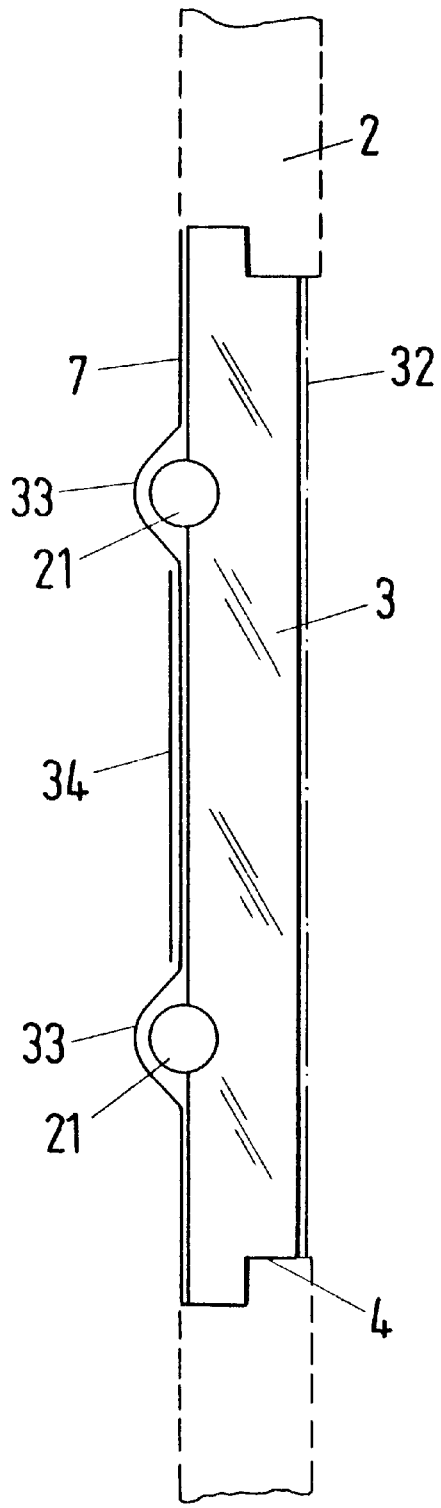
FIG. 8 shows a light window of the fifth embodiment of the exterior rearview mirrors.

FIG. 8 shows schematically and in section the light window 3 which is again comprised of light guide material. As in the previous embodiments it is inserted into the mounting opening 4 of the mirror housing 2. At the outer side of light window 3 an optically active layer 32 is applied which can be embodied in the form of prisms, preferably a Fresnel lense, other lenses etc. At the back side of the light window 3, a cover 7 is provided in the housing interior with which the light window 3 is covered relative to the interior of the housing 2. A fluorescent tube 21 is partially embedded into the backside of the light window 3. The fluorescent tube 21 can be embodied according to the embodiments of FIGS. 4 and 5 so that FIG. 8 shows the two legs of the U-shaped fluorescent tube. However, it is also possible to provide two separate fluorescent tubes 21. They are embodied in the shown embodiment approximately to half their thickness into the light window 3 which is comprised of light guide material. The two fluorescent tubes 21, according to the embodiment of FIGS. 4 and 5, are called fluorescent lamps (CFLs). In the area of these fluorescent tubes 21 the cover 7 is formed so as to provide reflectors 33 which surround the fluorescent tubes 21 at a spacing. The reflectors 33 can also be elements that are separate from the cover 7. In this case, the cover 7 is interrupted in the area of the fluorescent tubes 21. The reflectors 33 ensure that the light emitted by the fluorescent tubes 21 is optimally guided to the light window 3.

In the area between the two reflectors 33 at least one heating element 34 is provided which is advantageously embodied as a heating foil which is fastened to the cover 7. The heating element 34 that is connected to the electrical system of the motor vehicle, heats the reflectors 33, respectively, the cover 7 so that the fluorescent tubes 21 are maintained at an optimal temperature. Such an optimal temperature is approximately 25° C. The heating element 34 also ensures that the light window 3 will not collect condensation (fog) thereon. The heating element 34 is preferably controlled for which purpose a thermostat, such a PTC etc., is provided.

It is also possible to form the cover 7 by a heating element, preferably a heating foil. The fluorescent tubes 21 conventionally emit yellow light so that the light window 3 can be transparent and clear. However, it is also possible to have the light window 3 colored or to provide a colored foil at the backside of the light window 3.

The fluorescent tube can be designed so as to match the contour of the light window 3, as is, for example, shown in the embodiment according to FIGS. 4 and 5. Thus, the light window 3 can have various designs.

The specification incorporates by reference the disclosure of German priority document 298 04 489.7 of Mar. 13, 1998.

The present invention is, of course, in no way restricted to the specific disclosure of the specification and drawing, but also encompasses any modifications within the scope of the appended claims.

What is claimed is:

1. An exterior rearview mirror for a motor vehicle, said mirror comprising:
  a mirror head (1) having a housing (2) and a mirror pane mounted in said housing (2);
  said housing having a light window (3);
  at least one light source (18, 21) mounted in said housing (1) and positioned behind said light window (3);
  wherein said light window (3) is at least partially comprised of a light guide material.

2. A mirror according to claim 1, wherein said light window (3) has a rim (5) extending at least over a portion of a periphery of said light window (3), wherein said rim (5) rests at an inner side of said housing (2).

3. A mirror according to claim 1, wherein said at least one light source is an LED (18).

4. A mirror according to claim 1, wherein said at least one light source is a fluorescent tube (21).

5. A mirror according to claim 1, further comprising at least one cover (7) positioned inside said housing (2) to cover said light window (3) relative to the interior of said housing (2), wherein said at least one light source (18, 21) is positioned behind said cover (7) in said interior of said housing (2).

6. A mirror according to claim 5, wherein said cover (7) has at least one opening (19) for light emitted by said at least one light source (18, 21).

7. A mirror according to claim 6, wherein said at least one opening (19) has a transparent covering (16).

8. A mirror according to claim 7, wherein said covering (16) is a foil or a plastic disk.

9. A mirror according to claim 7, wherein said covering (16) is spaced from said light window (3).

10. A mirror according to claim 7, wherein said covering (16) is uncolored.

11. A mirror according to claim 7, wherein said covering (16) is colored.

12. A mirror according to claim 7, wherein said covering (16) is position-secured by said cover (7).

13. A mirror according to claim 5, wherein said cover (7) has a projecting edge (9) resting at a rim (5) of said light window (3).

14. A mirror according to claim 13, wherein said cover (7) presses said rim (5) against an inner side (6) of said housing (2).

15. A mirror according to claim 5, further comprising a seal (8) positioned between said cover (7) and said inner side of said housing (2).

16. A mirror according to claim 15, wherein said seal (8) surrounds said rim (5) of said light window (3).

17. A mirror according to claim 5, wherein said at least one light source (18) is an LED, wherein said cover (7) has at least one opening (19) for light emitted by said LED (18) and wherein said LED penetrates partially into said at least one opening (19).

18. A mirror according to claim 3, wherein a plurality of said LEDs (18) are positioned behind said light window (3) at a side of said light window (3) facing away from the vehicle.

19. A mirror according to claim 3, wherein a plurality of said LEDs (18) are arranged behind said light window (3) across a width and/or height of said light window (3).

20. A mirror according to claim 3, further comprising a Fresnel lens (29) wherein a plurality of said LEDs (18) are positioned behind said Fresnel lens (29).

21. A mirror according to claim 20, further comprising at least one cover (7) positioned inside said housing (2) to cover said light window (3) relative to the interior of said housing (2), wherein said LEDs (18) are positioned behind said cover (7) in said interior of said housing (2), wherein said Fresnel lens (29) is arranged between said cover (7) and said light window (3).

22. A mirror according to claim 21, wherein said Fresnel lens (29) is connected to said cover (7).

23. A mirror according to claim 20, further comprising an LED housing (31) in which said LEDs (18) are positioned.

24. A mirror according to claim 23, wherein said LED housing (31) is connected to said cover (7).

25. A mirror according to claim 24, wherein said LED housing (31) is positioned at a side of said cover (7) facing away from said light window (3).

26. A mirror according to claim 4, wherein said fluorescent tube (21) is U-shaped.

27. A mirror according to claim 4, wherein said fluorescent tube (21) is at least partially embedded in said light window (3).

28. A mirror according to claim 4, further comprising a reflector (33) positioned behind said fluorescent tube (21) inside said housing (2).

29. A mirror according to claim 28, further comprising at least one cover (7) positioned inside said housing (2) to cover said light window (3) relative to the interior of said housing (2), wherein said reflector (33) is a part of said cover (7).

30. A mirror according to claim 29, wherein said reflector (33) is a formed portion of said cover (7).

31. A mirror according to claim 5, wherein said light window (3) is at least partially heated.

32. A mirror according to claim 31, further comprising at least one heating element (34) for heating said light window (3).

33. A mirror according to claim 32, wherein said heating element (34) is located at a side of said light window (3) facing away from said cover (7).

34. A mirror according to claim 32, wherein said heating element (34) forms at least part of said cover (7).

35. A mirror according to claim 32, wherein said heating element (34) is a heating foil.

* * * * *

UNITED STATES PATENT AND TRADEMARK OFFICE
CERTIFICATE OF CORRECTION

PATENT NO. : 6,139,171
DATED : October 31, 2000
INVENTOR(S) : Bernd Waldmann

It is certified that error appears in the above-identified patent and that said Letters Patent is hereby corrected as shown below:

Title page,
The following should read as follows:
[30]   Foreign Application Priority Data
Mar. 13, 1997   [DE]   Germany .... 298 04 489 U Signed and Sealed this Twenty-third Day of October, 2001

Attest:

NICHOLAS P. GODICI
Attesting Officer   Acting Director of the United States Patent and Trademark Office